United States Patent Office 3,525,231
Patented Aug. 25, 1970

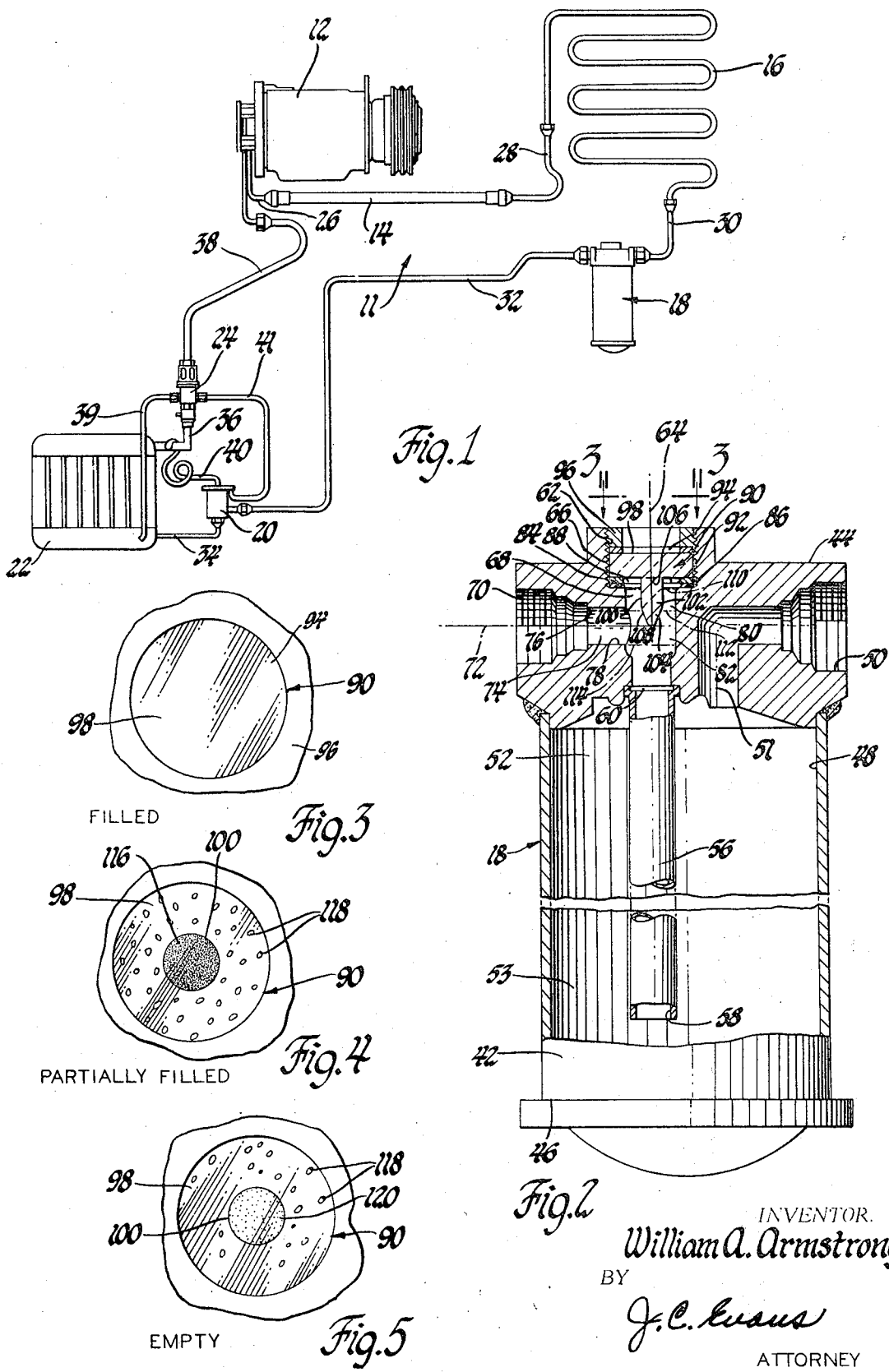

3,525,231
REFRIGERANT CHARGE LEVEL INDICATOR
William A. Armstrong, Grosse Ile, Mich., assignor to General Motors Corporation, Detroit, Mich., a corporation of Delaware
Filed Jan. 28, 1969, Ser. No. 794,583
Int. Cl. F25b 49/00; G01f 23/02
U.S. Cl. 62—125                                2 Claims

ABSTRACT OF THE DISCLOSURE

In preferred form, an air-conditioning refrigerant liquid level indicator comprising a transparent sightglass and an attaching stem having a cylindrical portion and a conical tip. The sightglass is mounted in the housing of a liquid reservoir; the attaching stem is located within the liquid containing space, the conical tip being directly in the liquid flow path offering minimal fluid flow resistance thereto. The sightglass will appear dark when the reservoir is completely filled with liquid, the attached stem will cause a clearly distinguishable dark area to appear within the sightglass when the fluid reservoir is partially filled and a clearly distinguishable light area therein when the fluid reservoir is empty.

---

This invention is directed toward an improved method of determining liquid level in a mixed phase fluid flow system; and more particularly, to a liquid level indicator for a vehicular refrigerant system.

Air-conditioning equipment has become commonplace on automotive vehicles. To be effective as a cooling means, air-conditioning systems must maintain a sufficient refrigerant charge. Furthermore, efficiency of operation requires that the refrigerant charge be freely flowing.

Sightglasses have long been used as a means of monitoring liquid in a closed container. However, in a mixed phase fluid flow system, such as an air-conditioning system using a Freon type refrigerant, a sightglass is not entirely suitable. This is especially true when the important liquid level changes are small. Often times the observer is required to note the presence of vapor bubbles to detect a less than filled container. The reliability of this method is temperature dependent, as continuous bubbles may appear in a properly charged system on a cool day. Secondly, the system must have been in operation several minutes of warm days to obtain an accurate indication.

Indicators that require moving parts, in addition to being more expensive, tend to restrict liquid flow and require elaborate fluid seals if the system is to be operated at other than atmospheric pressure.

It has been desirable to develop a liquid level indicator which accurately reflects the amount of refrigerant charge remaining in an air-conditioning system without appreciably obstructing the refrigerant flow. Furthermore, vehicular applications require additionally that the liquid level indicator be economically mass producible and readily useable such that the refrigerant charge may be checked at periodic intervals; for example, when refueling the vehicle or the like.

Accordingly, it is an object of this invention to provide a liquid level indicator that is readily useable.

Another object of this invention is to provide a liquid level indicator that is accurate enough to detect small changes in liquid level.

It is still another object of this invention to provide a liquid level indicator that has no moving parts.

It is yet another object of this invention to provide a liquid level indicator in a refrigerant flow system that is not temperature dependent.

Further objects and advantages will be apparent from the drawings and following descriptions.

FIG. 1 is a diagrammatic representation of a vehicle air-conditioning system.

FIG. 2 is a partial breakaway view of a dehydrator-receiver showing the sightglass and liquid level indicating stem mounted therein.

FIG. 3 is a view taken along line 3—3 of FIG. 2 indicating what is seen in the sightglass when the dehydrator-receiver is filled with refrigerant charge.

FIG. 4 is the same view as shown in FIG. 3 but indicating what is seen in the sightglass when the dehydrator-receiver is partially filled with refrigerant charge.

FIG. 5 is the same view as FIG. 4 indicating what is seen in the sightglass when the dehydrator-receiver is insufficiently filled with refrigerant charge.

Referring now to FIG. 1 where an air-conditioning system 11 for a vehicle is diagrammatically shown. The primary components of system 11 are: a mechanically driven compressor 12, conventionally driven from a vehicle engine not shown; a sound muffler 14; a condenser 16; a dehydrator-receiver 18; an expansion valve 20; an evaporator 22; and a suction throttling valve 24.

The above components are connected in fluid flow relationship by the now to be described conduits. Conduit 26 is connected from the fluid outlet of compressor 12 to the inlet of sound muffler 14. Conduit 28 connects the outlet of sound muffler 14 to the inlet of condenser 16. Conduit 30 connects the outlet of condenser 16 to the inlet of dehydrator-receiver 18. Conduit 32 connects the outlet of dehydrator-receiver 18 to the inlet of expansion valve 20. Conduit 34 connects the outlet of expansion valve 20 to the inlet of evaporator 22. Conduit 36 connects the outlet of evaporator 22 to the inlet of suction throttling valve 24.

Conduit 38 completes the refrigerant loop by connecting the outlet of suction throttling valve 24 to the inlet of compressor 12. By pass conduit 39, connected between evaporator 22 and valve 24, functions as an oil return path. Capillary tube 40, connected from valve 20 to conduit 36, provides temperature sensing means to control expansion valve 20 and is filled with a suitable heat sensitive gaseous substance such as carbon dioxide or the like. Conduit 41 operates as an equalizing line between suction valve 24 and expansion valve 20 to further control the flow of refrigerant into evaporator 22.

The operation of vehicle air-conditioning system 11 is conventional in that heat laden refrigerant vapor is compressed in compressor 12, forced into conduit 26 thereby traveling to sound muffler 14. Sound muffler 14 reduces the noise level of the compressed flowing refrigerant vapor. Refrigerant vapor flows out of muffler 14 via conduit 28 to condenser 16 wherein most of the vapor is condensed to refrigerant liquid still under pressure.

Conduit 30 transports the refrigerant fluid to dehydrator-receiver 18 which functions as a pressurized liquid reservoir. Conduit 32 provides a means for the refrigerant liquid to reach expansion valve 20. A controlled amount of refrigerant is allowed to flow into evaporator 22 via conduit 34.

Evaporator 22 contains a high volumetric flow passage; therefore, it is a relatively low pressure area and liquid refrigerant, as a consequence, immediately begins to boil at a low temperature as it enters evaporator 22. As the refrigerant passes through evaporator 22 refrigerant liquid continues to boil absorbing heat from the surrounding air, thereby cooling this air.

Suction throttling valve 24 controls the refrigerant vapor flow out of evaporator 22 into conduit 36 and thereby controlling the rate of vapor flow via conduit 38 back to compressor 12.

In accordance with certain principles of the present invention, the above described system 11 includes improved means for detecting the amount of refrigerant charge remaining therein; and more particularly at dehydrator-receiver 18.

Thus, referring now to FIG. 2, a breakaway view of dehydrator-receiver 18 is shown including a housing 42. Housing 42 is shaped in generally a cylindrical fashion having a top surface 44, a bottom surface 46, and side wall 48. Contained within side wall 48 is a cylindrical inlet bore 50 permitting fluid ingress via a right angle passageway 51 into a receiving chamber 52 having bottom region 53. Receiving chamber 52 is defined by top surface 44, bottom surface 46 and side wall 48.

In fluid communication with receiving chamber 52 is an upstanding vertical standpipe 56 having a bottom opening 58 near bottom surface 46 and an outwardly flared top opening 60 rigidly secured to top surface 44. Top surface 44 contains a cylindrical bore 62, having a longitudinal centerline 64, in axial alignment with standpipe 56 and receiving fluid therefrom. Bore 62 further contains a threaded upper portion 66 and a bottom fluid carrying portion 68.

Side wall 48 further contains a cylindrical bore 70 having a centerline 72, providing a fluid outlet from housing 42 via a tubular fluid passageway 74 which is in axial alignment with bore 70. Passageway 74 intersects fluid carrying portion 68 and has a top surface 76 and a bottom surface 78. Top surface 76 divides portion 68 into a top segment 80 and bottom segment 82. A shoulder surface 84 within bore 62 contains an annular O-ring 86 and an annular washer 88.

A new and improved cylindrical transparent sightglass 90 having a bottom surface 92 and a top surface 94 is secured within threaded portion 66 of bore 62 by a tubular retaining nut 96 which urges the bottom surface 92 of sightglass 90 against O-ring 86 and washer 88 providing a fluid seal. Retainer nut 96 resting against top surface 94 defines a circular look-through viewing surfaces 98.

Rigidly attached to bottom surface 92 at a point directly underlying surface 98, and in perpendicular relationship, is a downward facing stem 100 comprising a transparent cylindrical rod segment 102 and a light reflecting conical tip 104 which terminates at approximately the intersection of centerline 64 and centerline 72. The cylindrical rod segment 102 has a base 106 which has a width approximately ⅓ of the longitudinal length of cylindrical sightglass 90; the conical tip 104 has sides 108 which make a 45° intersection with the plane of base 106.

Cylindrical rod segment 102 comprises that portion of stem 100 within top segment 80 of portion 68 of bore 62. Conical tip 104 comprises that portion of stem 100 within bottom segment 82 of portion 68 of bore 62.

The index of refraction of conical tip 104 is such that the conical tip 104 will not reflect light when it is immersed in refrigerant liquid but will reflect light when surrounded by refrigerant vapor or air. A working embodiment of sightglass 90 and stem 100 was constructed out of, Lucite plastic; however, production models must be made of glass or other structurally adequate material to withstand the environment of high pressure and high temperatures.

Turning now to a detailed functional description of this embodiment of the invention, dehydrator-receiver 18 as previously mentioned serves as a high pressure fluid reservoir. Fluid entering inlet bore 50 is partially liquid and partially vapor. The fluid enters receiving chamber 52 via fluid passageway 51. Because of the relative densities of refrigerant vapor and liquid, the liquid drops to bottom region 53 of receiving chamber 52 where it is forced into standpipe 56 via bottom opening 58. The now upwardly traveling liquid enters fluid carrying portion 68 of bore 62 completely filling portion 68, providing a sufficient refrigerant liquid is available, thereby immersing stem 100 entirely in liquid. Tubular passageway 74 permits fluid egress into bore 70 which serves as an outlet into conduit 32.

As previously mentioned, liquid flow restrictions may cause an air-conditioning system to malfunction. If outlet bore 70 is blocked for example, suction pressure will be low and there will be little or no cooling. Furthermore, restrictions within dehydrator-receiver 18 may cause the refrigerant to vaporize as it enters conduit 32 making outlet bore 70 excessively cold.

Since tubular passageway 74 is in bottom segment 82 of fluid carrying portion 68, the liquid flow path from receiving chamber 52 is through standpipe 56, bottom segment 82, tubular passageway 74 and into bore 70. Cylindrical rod segment 102 comprising that portion of stem 100 in top segment 80 of fluid carrying portion 68 does not obstruct liquid flow. Conical tip 104 being the only part of stem 100 spacially within the liquid flow pattern causes minimal fluid resistance.

It is easily seen that the above configuration does not cause significant pressure differential between inlet bore 50 and outlet bore 70; yet, this configuration provides the advantages of a good liquid level indicator as is now to be pointed out.

Refrigerant liquid levels may be monitored by an observer looking through surface 98 of sightglass 90. If dehydrator-receiver 18 is filled with refrigerant liquid, as defined by liquid level 110 in FIG. 2, stem 100 will be completely immersed in liquid. Light passing through surface 98 will be entirely absorbed and surface 98 will appear dark as shown in FIG. 3.

If dehydrator-receiver 18 is partially filled with refrigerant liquid, as defined by liquid level 112 in FIG. 2, top segment 80 of fluid carrying portion 68 will contain a plurality of vapor bubbles 118. Light passing through surface 98 directly above stem 100 will still be entirely absorbed; however, light entering the remainder of surface 98 will be reflected by air and vapor bubbles 118 and an observer will see dark area 116 as shown in FIG. 4, overlying stem 100 and a plurality of vapor bubbles 118 surrounding dark area 116.

If dehydrator-receiver 18 contains only an amount of refrigerant sufficient to cause liquid level 114, as shown in FIG. 2, conical tip 104 will be surrounded by air and vapor bubbles 118. Light passing through surface 98 directly above stem 100 will be reflected and an observer will see a bright surface 120, as shown in FIG. 5, overlying stem 100 indicating dehydrator-receiver 18 contains an insufficient amount of refrigerant liquid.

While the embodiment of the present invention as herein disclosed constitutes a preferred form, it is to be understood that other forms might be adopted.

I claim:

1. In a refrigerant system having a compressor, a condenser, an evaporator, a dehydrator-receiver and means to connect said components in fluid flow relationship the improvement comprising: said dehydrator-receiver having a housing including a fluid inlet; a fluid receiving chamber having an upper and a lower section in said housing in fluid communication with said inlet; a vertical standpipe in fluid communication with said lower section of said receiving chamber; a fluid outlet in said housing having a centerline; a bore in said housing axial alignment with said standpipe and in intersecting relationship with said outlet; said bore further including a top portion, a bottom fluid flow portion having a top segment and a centerline intersecting said centerline of said outlet; a transparent sightglass; said sightglass having a cylindrical base secured in said housing providing a look-through viewing surface; liquid level indicating means having a downwardly depending stem; said stem being rigidly secured to said base portion of said sightglass at a point directly underlying said look-through viewing surface of said base portion and terminating at approximately said intersection of said centerline of said bore and said centerline of said outlet; said stem further having an end portion within said fluid flow portion of said bore with means thereon for causing diffusion or reflection whereby light passing into said look-through viewing surface of said sightglass when said top portion of said bore is completely filled with refrigerant liquid will be completely absorbed and said look-through viewing surface will appear dark, and when the liquid level is at a level within said top segment of said fluid flow portion said look-through viewing surface will reveal a plurality of vapor bubbles surrounding a dark surface at a point immediately overlying said stem; said sightglass and stem further being operative, when the refrigerant liquid level in said bore is below the said intersection of the said centerline of said outlet and the centerline of said bore, to cause light passing through said look-through viewing surface to be reflected by said end portion of said stem and a bright outline of said end portion will appear in said look-through viewing surface.

2. In a refrigerant system having a compressor, a condenser, an evaporator, a dehydrator-receiver and means to connect said components in fluid flow relationship the improvement comprising: said dehydrator-receiver having a housing including a fluid inlet; a fluid receiving chamber having an upper and a lower section in said housing in fluid communication with said inlet; a vertical standpipe in fluid communication with said receiving chamber; a fluid outlet in said housing having a centerline; a bore in said housing in axial alignment with said standpipe and in intersecting relationship with said outlet; said bore further including a top portion, a bottom fluid flow portion and a centerline intersecting said centerline of said outlet; a transparent sightglass; said sightglass having a cylindrical base secured in said housing providing a look-through viewing surface; liquid level indicating means including a downwardly depending stem having a transparent cylindrical portion of a conically shaped end portion; said stem being rigidly secured to said base portion of said sightglass at a point directly underlying said look-through viewing surface of said base portion and terminating at approximately the said intersection of the said centerline of said bore and the said centerline of said outlet; said cylindrical portion of said stem constituting that portion of said stem in said top portion of said bore; said conically shaped end portion of said stem constituting that portion of said stem in said bottom fluid flow portion of said bore thereby minimizing any obstruction to fluid flow; said conically shaped end portion of said stem further having means thereon for causing diffusion or reflection whereby light passing through said look-through viewing surface of said sightglass when said top portion of said bore is completely filled with refrigerant liquid will be completely absorbed and said look-through viewing surface will appear dark, and when the liquid level is at a level within said top segment of said fluid flow portion said look-through viewing surface will reveal a plurality of vapor bubbles surrounding a dark surface at a point immediately overlying said stem; said sightglass and stem further being operative when the refrigerant liquid level in said bore is below the said intersection of the said centerline of the side outlet and the centerline of said bore to cause light passing through said look-through viewing surface to be reflected by said end portion of said stem and a bright outline of said end portion will appear in said look-through viewing surface.

References Cited
UNITED STATES PATENTS

| | | | |
|---|---|---|---|
| 470,858 | 3/1892 | Klinger | 73—327 |
| 2,600,435 | 6/1952 | Shapiro | 62—125 X |
| 3,000,345 | 9/1961 | Gray et al. | 116—117 |
| 3,069,980 | 12/1962 | Lonn | 73—327 |
| 3,108,566 | 10/1963 | Chatlos | 116—117 |
| 3,122,124 | 2/1964 | Yocum | 73—73 X |
| 3,191,397 | 6/1965 | Kennedy | 62—125 |

S. CLEMENT SWISHER, Primary Examiner

D. M. YASICH, Assistant Examiner

U.S. Cl. X.R.

73—328